(12) United States Patent
Osada et al.

(10) Patent No.: US 11,682,771 B2
(45) Date of Patent: Jun. 20, 2023

(54) ELECTROCHEMICAL CELL AND ELECTROCHEMICAL CELL STACK

(71) Applicant: TOSHIBA ENERGY SYSTEMS & SOLUTIONS CORPORATION, Kawasaki (JP)

(72) Inventors: Norikazu Osada, Ota Tokyo (JP); Tsuneji Kameda, Ota Tokyo (JP)

(73) Assignee: TOSHIBA ENERGY SYSTEMS & SOLUTIONS CORPORATION, Kawasaki (JP)

( * ) Notice: Subject to any disclaimer, the term of this patent is extended or adjusted under 35 U.S.C. 154(b) by 0 days.

(21) Appl. No.: 17/363,323

(22) Filed: Jun. 30, 2021

(65) Prior Publication Data
US 2022/0006102 A1 Jan. 6, 2022

(30) Foreign Application Priority Data

Jul. 2, 2020 (JP) .............................. JP2020-114580

(51) Int. Cl.
*H01M 4/90* (2006.01)
*H01M 4/86* (2006.01)
*H01M 8/1213* (2016.01)
*H01M 8/12* (2016.01)

(52) U.S. Cl.
CPC ....... *H01M 4/9025* (2013.01); *H01M 4/8621* (2013.01); *H01M 8/1213* (2013.01); *H01M 2008/1293* (2013.01); *H01M 2300/0077* (2013.01)

(58) Field of Classification Search
None
See application file for complete search history.

(56) References Cited

U.S. PATENT DOCUMENTS

| 2011/0177424 A1 | 7/2011 | Goto |
| 2013/0248360 A1 | 9/2013 | Osada et al. |

FOREIGN PATENT DOCUMENTS

| JP | 2010-003478 A | 1/2010 |
| JP | 2018-154864 A | 10/2018 |
| JP | 2019-157146 A | 9/2019 |
| JP | 2020-187864 A | 11/2020 |
| WO | WO-2018/167889 A1 | 9/2018 |

OTHER PUBLICATIONS

Kawada et al., "Resistance of (La, Sr)CoO$_3$ / YSZ Interface With a Ceria Interlayer", Proceedings of the Electrochemical Society, Proceedings vol. 2005-07, 1695-1702 (2005) DOI: 10.1149/200507. 1695PV.
Sase et al., "Interfacial reaction and electrochemical properties of dense (La,Sr) CoO$_{3-\delta}$ cathode on YSZ (1 0 0)", Journal of Physics and Chemistry of Solids 66 (2005) 343-348.
Tao et al., "Polarization properties of La$_{0.6}$Sr$_{0.4}$Co$_{0.2}$Fe$_{0.8}$O$_3$-based double layer-type oxygen electrodes for reversible SOFCs", Electrochimica Acta 54 (2009) 3309-3315.

*Primary Examiner* — Sarah A. Slifka
(74) *Attorney, Agent, or Firm* — Foley & Lardner LLP

(57) ABSTRACT

An electrochemical cell according to an embodiment includes a hydrogen electrode, an electrolyte laminated on the hydrogen electrode, a barrier-layer laminated on the electrolyte, and an oxygen electrode laminated on the barrier-layer. The barrier-layer has a porous structure having a thickness of greater than 20 μm and a porosity of greater than 10%.

5 Claims, 5 Drawing Sheets

|  | BARRIER-LAYER THICKNESS (μm) | POROSITY(%) | PRESSURE LOSS (Mpa m$^{-1}$) | CURRENT DENSITY (Acm$^{-2}$@1.3V) |
|---|---|---|---|---|
| EXAMPLE1 | 300 | 80 | 1.2 | 0.92 |
| EXAMPLE2 | 100 | 80 | 5 | 0.88 |
| EXAMPLE3 | 500 | 80 | 0.2 | 0.88 |
| EXAMPLE4 | 100 | 60 | 10 | 0.85 |
| COMPARATIVE EXAMPLE1 | 5 | 8 | UNMEASURABLE | 0.68 |
| COMPARATIVE EXAMPLE2 | 20 | 10 | UNMEASURABLE | 0.59 |

FIG. 5

ELECTROCHEMICAL CELL AND ELECTROCHEMICAL CELL STACK

CROSS-REFERENCE TO RELATED APPLICATIONS

This application is based upon and claims the benefit of priority from JP Patent Application No. 2020-114580, filed on Jul. 2, 2020; the entire contents of which are incorporated herein by reference.

FIELD

An embodiment of the present invention relates to an electrochemical cell and an electrochemical cell stack.

BACKGROUND

A solid oxide electrochemical cell can have sufficient reaction speed without the use of an expensive precious metal catalyst due to its high operation temperature (600 to 1000° C.). For this reason, the solid oxide electrochemical cell, when operating as a solid oxide fuel cell (SOFC), has the highest power generation efficiency and generates less $CO_2$ as compared with other types of fuel cells. Therefore, the solid oxide electrochemical cell is expected as a clean power generation system of the next generation.

The solid oxide electrochemical cell, when operating as a solid oxide electrolysis cell (SOEC), can produce hydrogen theoretically at a low electrolytic voltage due to its high operation temperature. Therefore, the solid oxide electrochemical cell is expected as a high-efficiency hydrogen production device. Additionally, the solid oxide electrochemical cell is examined for use as a power storage system with SOFC/SOEC.

For an oxygen electrode of the solid oxide electrochemical cell, a perovskite oxide having high conductivity is generally used. For example, a lanthanum-manganese based oxide ($LaMnO_3$ based) is often used for an oxygen electrode of high temperature operation type and a lanthanum-cobalt based oxide ($LaCoO_3$ based) is often used for an oxygen electrode of middle-and-low temperature operation type. The $LaCoO_3$ based oxide has higher electric conductivity and higher electrode catalytic activity compared with those of the $LaMnO_3$ based oxide. On the other hand, the $LaCoO_3$ based oxide has higher reactivity with a zirconia based oxide ($ZrO_2$ based) generally used as an electrolyte of the solid oxide electrochemical cell. For this reason, a solid-phase reaction may occur during firing in the cell manufacture. In this case, a high resistance phase composed of $La_2Zr_2O_7$ or the like may be formed such that the cell performance may deteriorate.

A known method to prevent the formation of the high resistance phase is to form a dense and thin barrier-layer made of a $CeO_2$-based oxide between the electrolyte and the oxygen electrode.

When the electrochemical cell having the above-mentioned barrier-layer formed therein operates at a high temperature, a component of the electrolyte and a component of the oxygen electrode diffuse and the form of the $CeO_2$-based oxide is changed such that the cell performance may deteriorate.

BRIEF DESCRIPTION OF THE DRAWINGS

FIG. 5 is a table showing evaluation measurement results of Examples and Comparative Examples.

DETAILED DESCRIPTION

Hereinafter, electrochemical cells according to the present invention are described. However, the present invention should not be construed as being limited to the following embodiment and examples. The schematic views referred to in the following description are intended to illustrate the positional relationships between components, and the size of particles, the thickness ratio of layers, and the like do not necessarily correspond to actual ones.

An electrochemical cell according to an embodiment includes a hydrogen electrode, an electrolyte laminated on the hydrogen electrode, a barrier-layer laminated on the electrolyte, and an oxygen electrode laminated on the barrier-layer. The barrier-layer has a porous structure having a thickness of greater than 20 μm and a porosity of greater than 10%.

Figure 1:
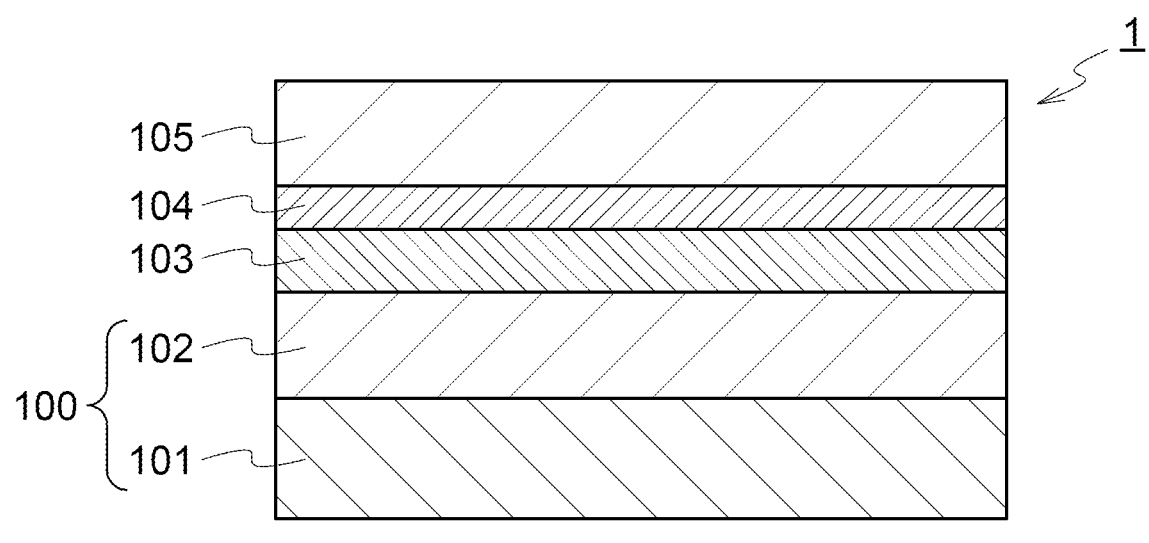
FIG. 1 is a simplified cross sectional view of a structure of a part of an electrochemical cell according to an embodiment.

FIG. 1 is a simplified cross sectional view of a structure of a part of an electrochemical cell according to an embodiment. The electrochemical cell 1 according to the present embodiment is a solid oxide electrochemical cell of hydrogen electrode support type. In the electrochemical cell 1, a hydrogen electrode 100, an electrolyte 103, a barrier-layer 104, and an oxygen electrode 105 are laminated in this order.

The hydrogen electrode 100 is composed of a substrate 101 and an active layer 102 laminated on the substrate 101. The substrate 101 may be a porous layer or may have the same structure as that of the active layer 102. For the substrate 101 and the active layer 102, a sintered body containing a metal particulate and a metal oxide may be used. The metal particulate contained in the sintered body or contained in the oxide in the form of a solid solution includes, for example, one or more metals selected from the group consisting of nickel (Ni), cobalt (Co), iron (Fe), and copper (Cu), or alloys containing these metals.

The metal oxide includes, for example, a stabilized zirconia containing one or more stabilizers selected from the group consisting of yttrium oxide ($Y_2O_3$), scandium oxide ($Sc_2O_3$), ytterbium oxide ($Yb_2O_3$), gadolinium oxide ($Gd_2O_3$), calcium oxide (CaO), magnesium oxide (MgO), cerium oxide ($CeO_2$), and the like in the form of a solid solution, as well as a doped ceria in which one or more oxides selected from the group consisting of samarium oxide ($Sm_2O_3$), $Gd_2O_3$, $Y_2O_3$, and the like and $CeO_2$ form a solid solution.

The electrolyte 103 is composed of a stabilized zirconia containing one or more stabilizers selected from the group consisting of $Y_2O_3$, $Sc_2O_3$, $Yb_2O_3$, $Gd_2O_3$, CaO, MgO, $CeO_2$, and the like in the form of a solid solution, or a doped ceria in which one or more oxides selected from the group consisting of $Sm_2O_3$, $Gd_2O_3$, $Y_2O_3$, and the like and $CeO_2$ form a solid solution.

The barrier-layer 104 is composed of a doped ceria in which one or more oxides selected from the group consisting of $Sm_2O_3$, $Gd_2O_3$, $Y_2O_3$, and the like and $CeO_2$ form a solid solution.

The oxygen electrode 105 is composed of a sintered body containing a perovskite oxide. The perovskite oxide is mainly represented by $Ln_{1-x}A_xB_{1-y}C_yO_{3-\delta}$. "Ln" includes rare earth elements such as lanthanum (La), for example. "A" includes strontium (Sr), calcium (Ca), and barium (Ba), for example. "B" and "C" include chromium (Cr), manganese (Mn), Co, Fe, and Ni, for example. For the perovskite oxide, x, y and δ satisfy $0 \leq x \leq 1$, $0 \leq y \leq 1$, and $0 \leq \delta \leq 1$. In addition to the perovskite oxide, the oxygen electrode 105 may further contain ceria in which one or more oxides selected from the group consisting of $Sm_2O_3$, $Gd_2O_3$, $Y_2O_3$, and the like are doped in $CeO_2$.

A laminated body, in which a plurality of electrochemical cells 1 configured as described above are laminated, is an electrochemical cell stack. In the electrochemical cell stack, all layers do not need to be the electrochemical cells 1, and at least one layer may be the electrochemical cell 1.

Hereinafter, a method of manufacturing the electrochemical cell 1 will be specifically described with reference to FIGS. 2A to 2D according to the following examples.

Example 1

Figure 2A:
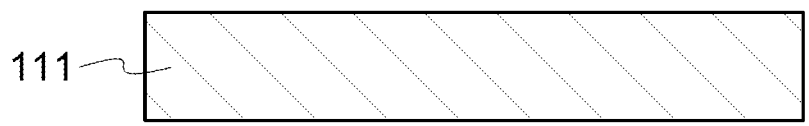
FIG. 2A is a cross sectional view illustrating a step of making a substrate precursor in Examples 1 to 4.

First, a substrate precursor 111 is made as illustrated in FIG. 2A. In this example, a powder is prepared, which is obtained by mixing, at a weight ratio of 6:4, nickel oxide (NiO) and $Gd_2O_3$-doped ceria (GDC) in which $Gd_2O_3$ is doped in ceria to give a composition of $(Gd_2O_3)_{0.1}(CeO_2)_{0.9}$. Subsequently, a paste made from the powder is formed into a sheet, and thereby the substrate precursor 111 is completed.

Figure 2B:
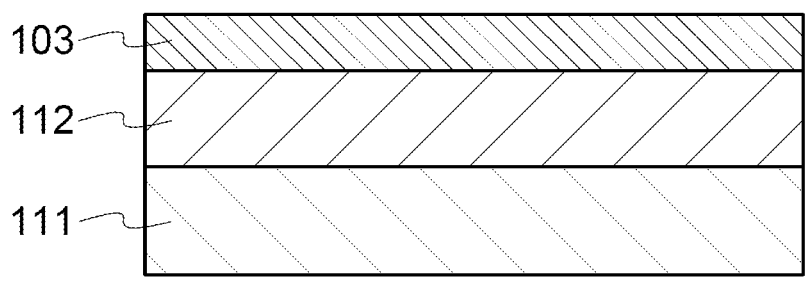
FIG. 2B is a cross sectional view illustrating a step of forming an active layer precursor and an electrolyte in Examples 1 to 4.

Next, as shown in FIG. 2B, an active layer precursor 112 is formed on the substrate precursor 111, and the electrolyte 103 is then formed on the active layer precursor 112. In this example, the active layer precursor 112 is made of a mixture of NiO and GDC. The electrolyte 103 is made using yttria-stabilized zirconia.

Figure 2C:
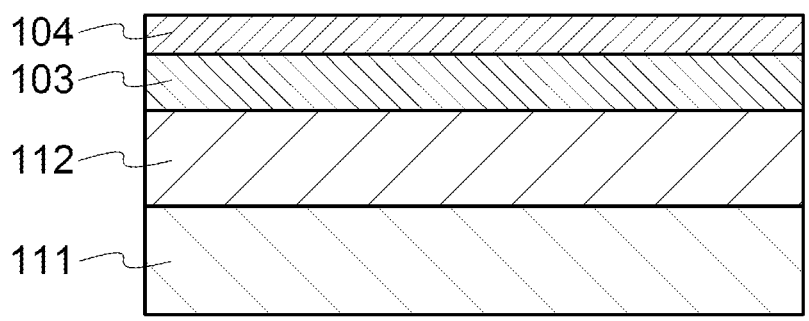
FIG. 2C is a cross sectional view illustrating a step of forming a barrier-layer in Examples 1 to 4.

Next, as illustrated in FIG. 2C, the barrier-layer 104 is formed on the electrolyte 103. In this example, GDC is fired, and the fired product is then formed into a porous structure having a thickness of 300 μm and a porosity of about 80%. The porosity represents a ratio of voids per unit volume. The porosity can be adjusted, for example, by adding a pore-forming material or by setting a porous pattern with a ceramic 3D printer and the like.

Next, the substrate precursor 111, the active layer precursor 112, the electrolyte 103, and the barrier-layer 104 are fired under a temperature condition of 1200° C. or higher and 1600° C. or lower. This firing step is performed until sufficient strength is obtained in the layers and between the layers.

Figure 2D:
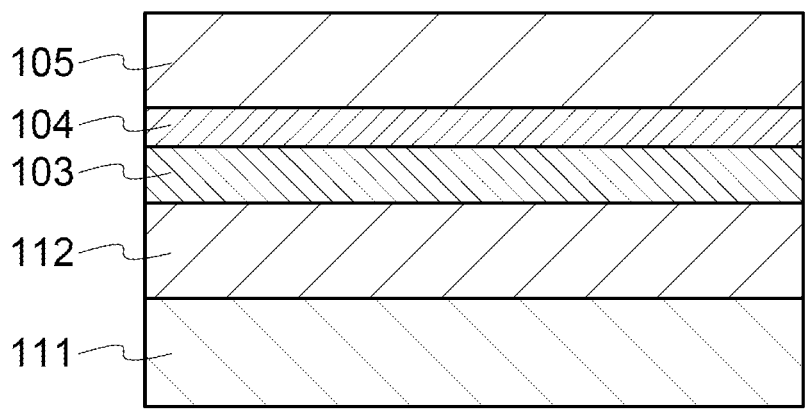
FIG. 2D is a cross sectional view illustrating a step of forming an oxygen electrode in Examples 1 to 4.

Next, as illustrated in FIG. 2D, the oxygen electrode 105 is formed on the barrier-layer 104. In this example, a layer composed of $La(Sr)Co(Fe)O_{3-\delta}$ is formed on the barrier-layer 104, and then fired within a range of 900° C. or higher and 1200° C. or lower. The oxygen electrode 105 can be thereby adhered firmly to the barrier-layer 104.

Next, the laminated body consisted of the substrate precursor 111, the active layer precursor 112, the electrolyte 103, the barrier-layer 104, and the oxygen electrode 105 is set in a hydrogen electrode output characteristic evaluation device. When dry hydrogen is circulated on the substrate precursor 111 side and an $N_2/O_2$-mixture gas obtained by mixing $N_2$ and $O_2$ at a volume ratio of 4:1 is circulated on the oxygen electrode 105 side, in the hydrogen electrode output characteristic evaluation device at 700° C. or higher, the substrate precursor 111 and the active layer precursor 112 are reduced, and the substrate 101 and the active layer 102 are formed. The electrochemical cell 1 illustrated in FIG. 1 is thereby completed.

The hydrogen electrode output characteristic evaluation device controls the concentration of vapor on the hydrogen electrode side and operates the electrochemical cell 1 in the SOFC mode or the SOEC mode so that the I-V characteristics indicating a relationship between a current and a voltage at that time can be evaluated. After the reduction reaction, the electrochemical cell 1 is operated as SOEC at a measurement temperature, and the initial I-V characteristic evaluation is performed.

After the I-V characteristic evaluation, the oxygen electrode 105 is separated and the pressure loss of the barrier-layer 104 is measured. In addition, a section of the electrochemical cell 1 is prepared to observe the structure of the barrier-layer 104 with a scanning electron microscope (SEM). From the obtained SEM image, the porosity of the barrier-layer 104 is calculated.

Example 2

In Example 2, on the substrate precursor 111, the active layer precursor 112, the electrolyte 103, the barrier-layer 104, and the oxygen electrode 105 are sequentially laminated by a manufacturing method similar to that in Example 1 described above. However, in this example, the thickness of the barrier-layer 104 is designed to be 100 μm, which is thinner than that in Example 1.

Next, the substrate precursor 111 and the active layer precursor 112 are reduced to form the substrate 101 and the active layer 102 by a manufacturing method also similar to that in Example 1. An electrochemical cell according to Example 2 is thereby completed.

Subsequently, the I-V characteristic evaluation of the electrochemical cell 1 in the initial state is performed as in Example 1. In addition, the pressure loss and the porosity of the barrier-layer 104 are also measured.

Example 3

Also in Example 3, on the substrate precursor 111, the active layer precursor 112, the electrolyte 103, the barrier-layer 104, and the oxygen electrode 105 are sequentially laminated by a manufacturing method similar to that in Example 1 described above. However, in this example, the thickness of the barrier-layer 104 is designed to be 500 μm, which is thicker than that in Example 1.

Next, the substrate precursor 111 and the active layer precursor 112 are reduced to form the substrate 101 and the active layer 102 by a manufacturing method also similar to that in Example 1. An electrochemical cell according to Example 3 is thereby completed.

Subsequently, the I-V characteristic evaluation of the electrochemical cell 1 in the initial state is performed as in Example 1. In addition, the pressure loss and the porosity of the barrier-layer 104 are also measured.

Example 4

Also in Example 4, on the substrate precursor 111, the active layer precursor 112, the electrolyte 103, the barrier-layer 104, and the oxygen electrode 105 are sequentially laminated by a manufacturing method similar to that in Example 1 described above. However, in this example, the thickness of the barrier-layer 104 is designed to be 100 μm, which is thinner than that in Example 1. In addition, the porosity of the barrier-layer 104 is designed to be about 60%, which porosity is smaller than that in Example 1, by adjusting the porous pattern with a ceramic 3D printer.

Next, the substrate precursor 111 and the active layer precursor 112 are reduced to form the substrate 101 and the active layer 102 by a manufacturing method also similar to that in Example 1. An electrochemical cell according to Example 4 is thereby completed.

Subsequently, the I-V characteristic evaluation of the electrochemical cell 1 in the initial state is performed as in Example 1. In addition, the pressure loss and the porosity of the barrier-layer 104 are also measured.

Comparative Example 1

In Comparative Example 1, a forming method of the barrier-layer 104 is different from that in Example 1 described above. In this comparative example, a slurry containing the GDC particle is coated on the electrolyte 103 using a screen printing method or a tape casting method. At that time, the thickness of the barrier-layer 104 is designed to be 5 μm, which is significantly thinner than that in Example 1.

After forming the barrier-layer 104 as described above, the oxygen electrode 105 is laminated on the barrier-layer 104 as in Example 1. The substrate precursor 111 and the active layer precursor 112 are then reduced to form the substrate 101 and the active layer 102. An electrochemical cell according to Comparative Example 1 is thereby completed.

Subsequently, the I-V characteristic evaluation of the electrochemical cell in the initial state is performed as in Example 1. In addition, the pressure loss and the porosity of the barrier-layer 104 are also measured.

Comparative Example 2

Also in Comparative Example 2, a forming method of the barrier-layer 104 is different from that in Example 1 described above. In this comparative example, the barrier-layer 104 is formed by coating a slurry containing the GDC particle on the electrolyte 103 as in Comparative Example 1 described above. However, in this comparative example, the thickness of the barrier-layer 104 is designed to be 20 μm, which is thicker than that in Comparative Example 1 and thinner than that in Example 1.

After forming the barrier-layer 104 as described above, the oxygen electrode 105 is laminated on the barrier-layer 104 as in Example 1. The substrate precursor 111 and the active layer precursor 112 are then reduced to form the substrate 101 and the active layer 102. An electrochemical cell according to Comparative Example 2 is thereby completed.

Subsequently, the I-V characteristic evaluation of the electrochemical cell in the initial state is performed as in Example 1. In addition, the pressure loss and the porosity of the barrier-layer 104 are also measured.

(Evaluation Measurement Results)

Figure 3:
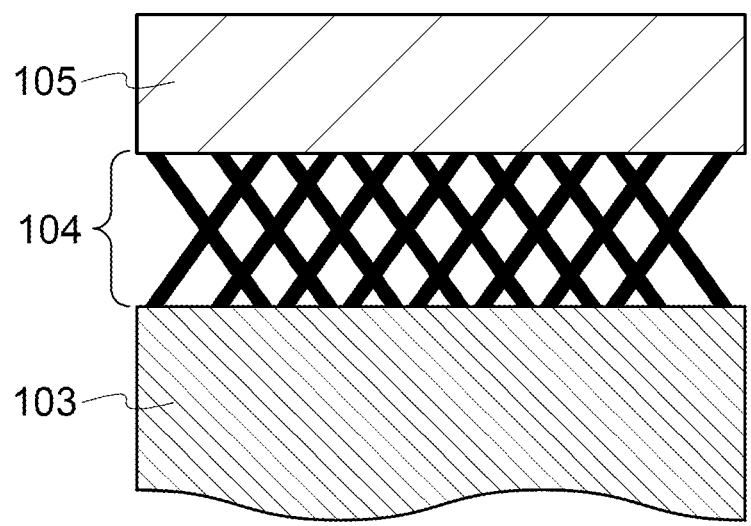
FIG. 3 is an enlarged cross sectional view of the barrier-layer formed in Examples.
Figure 4:
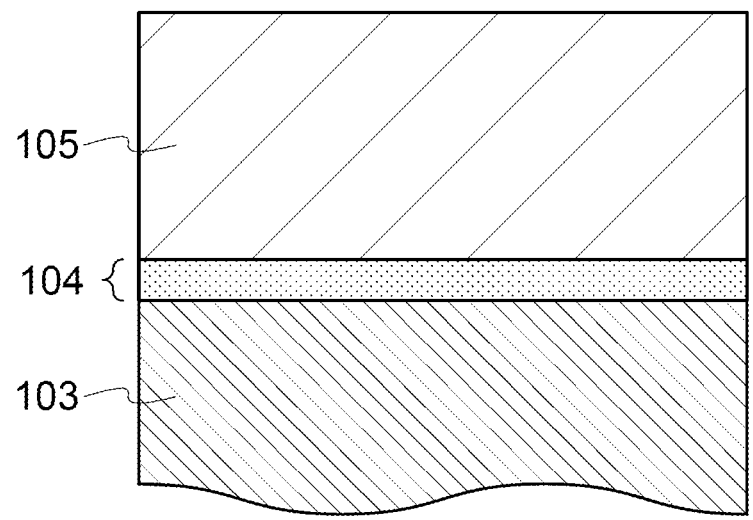
FIG. 4 is an enlarged cross sectional view of the barrier-layer formed in Comparative Examples.

FIG. 3 is an enlarged cross sectional view of the barrier-layer 104 formed in Examples 1 to 4. FIG. 4 is an enlarged cross sectional view of the barrier-layer 104 formed in Comparative Examples 1 and 2. FIG. 5 is a table showing evaluation measurement results of Examples and Comparative Examples.

The table in FIG. 5 shows the thickness, the porosity, and the pressure loss of the barrier-layer 104 and the current density of the electrochemical cell for each of Examples and Comparative Examples. The current density, which is one of the I-V characteristics, is a current density when the electrochemical cell is operated as SOEC at a voltage of 1.3 V. Each thickness of the barrier-layer 104 shown in the table is a measured value and is in agreement with each designed value.

The barrier-layer 104 formed in Examples 1 to 4 is thick as illustrated in FIG. 3, and has high porosity. Therefore, a component of the electrolyte 103 and a component of the oxygen electrode 105 are hard to diffuse. In particular, when the thickness is 100 to 500 μm, the porosity is 60% or greater, and the pressure loss is within a range of 0.1 to 10 MPa/m, the current density is at least 0.85 A/cm$^2$ or greater. As a result, the cell performance is improved.

On the other hand, the barrier-layer 104 formed in Comparative Examples 1 and 2 is thin as illustrated in FIG. 4, and has low porosity. In this case, the diffusion of a component of the electrolyte 103 and a component of the oxygen electrode 105 cannot be sufficiently suppressed, and thus the current density is 0.68 A/cm$^2$ or less. As a result, the cell performance is insufficient.

As described above, the electrochemical cell 1 having the barrier-layer 104 according to Examples 1 to 4 has a higher current density characteristic than that of the electrochemical cell according to Comparative Examples 1 and 2. Therefore, according to the present embodiment, the cell characteristics can be improved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An electrochemical cell comprising:
   a hydrogen electrode;
   an electrolyte laminated on the hydrogen electrode;
   a barrier-layer laminated on the electrolyte; and
   an oxygen electrode laminated on the barrier-layer,
   wherein the barrier-layer has a porous structure having a thickness of 100 μm or greater and 500 μm or less and a porosity of greater than 10%.

2. The electrochemical cell according to claim 1, wherein the barrier-layer has a porosity of 60% or greater.

3. The electrochemical cell according to claim 1, wherein the barrier-layer has a pressure loss of 0.1 MPa/m or greater and 10 MPa/m or less.

4. The electrochemical cell according to claim 1, wherein the barrier-layer is a doped ceria containing an oxide of at least one of gadolinium (Gd), samarium (Sm), and yttrium (Y).

5. An electrochemical cell stack comprising the electrochemical cell according to claim 1.

* * * * *